United States Patent [19]

Kazami et al.

[11] Patent Number: 5,179,409
[45] Date of Patent: Jan. 12, 1993

[54] FILM HOLDER FOR STORING PROCESSED PHOTOGRAPHIC FILM

[75] Inventors: Kazuyuki Kazami, Tokyo; Toshio Sosa, Narashino, both of Japan

[73] Assignee: Nikon Corporation, Tokyo, Japan

[21] Appl. No.: 888,293

[22] Filed: May 26, 1992

Related U.S. Application Data

[63] Continuation of Ser. No. 744,638, Aug. 8, 1991, abandoned, which is a continuation of Ser. No. 593,564, Oct. 9, 1990, abandoned, which is a continuation of Ser. No. 343,888, Apr. 27, 1989, abandoned.

[30] Foreign Application Priority Data

May 6, 1988 [JP] Japan .................. 63-109157
May 9, 1988 [JP] Japan .................. 63-110474

[51] Int. Cl.$^5$ ......................... G03B 27/62
[52] U.S. Cl. ........................ 355/75; 206/455
[58] Field of Search ........ 40/159, 159.2, 323, 40/357, 361, 405; 355/75; 206/455

[56] References Cited

U.S. PATENT DOCUMENTS 2,521,792  9/1950  Hollander ............. 40/537
4,247,999  2/1981  Latino ................. 40/159
4,533,048  8/1985  Ozeki .................. 40/159

FOREIGN PATENT DOCUMENTS

3020994  12/1981  Fed. Rep. of Germany ........ 40/361
925078    8/1947  France .............. 40/405
2001866  10/1969  France .............. 40/405
59-15814  1/1984  Japan .

Primary Examiner—Michael L. Gellner
Assistant Examiner—David M. Gray
Attorney, Agent, or Firm—Shapiro and Shapiro

[57] ABSTRACT

A film holder for storing a processed film is provided with a film holding section including a film container capable of accommodating a processed film to allow the film to be viewed therethrough and an information recording medium in which is recorded printing conditions concerning the processed film, and an information holding section provided on the film container for holding the information recording medium. The information holding section may be arranged to record information in electrical, magnetic or optical form. The film container may have a pair of film spools which support a processed film and an observation window which allows one frame of the processed film to be viewed therethrough. The information holding section may be arrranged to hold information relative to a printing process including color-correction information and the like.

14 Claims, 8 Drawing Sheets

FIG. 14

FILM HOLDER FOR STORING PROCESSED PHOTOGRAPHIC FILM

This is a continuation of application Ser. No. 744,638 filed Aug. 8, 1991; which is a continuation of application Ser. No. 593,564 filed Oct. 9, 1990; which is a continuation of application Ser. No. 343,888 filed Apr. 27, 1989, all of which are now abandoned.

BACKGROUND OF THE INVENTION

1. Field of the Invention

The present invention relates generally to a negative-film holder arranged to accommodate a so-called negative film after processsing and, more particularly, to a film holder which is used for storing a processed photographic film and which is convenient for a printing operation to be conducted after processing.

2. Related Background Art

It has heretofore been common practice for processed negative films to be returned to customers in the form of cut film pieces each having a predetermined number of frames and being accommodated in a thin, transparent film holder made from a synthetic-resin film. It is also known that conventional holders for reversal films consist of relatively thick film holding frames (mounts) each of which holds one of the separate frames cut from a processed film.

Such a conventional negative film holder has a number of disadvantages. For example, since the conventional negative holder easily curves due to its own weight while its one end is being supported in one hand, it is necessary to support both ends of the negative holder using both hands. Accordingly, such a negative holder is inconvenient to handle, particularly when the film images are to be viewed. In addition, since the negative film holder is semi-transparent, it is difficult to observe the negative film when accommodated in the holder. Moreover, in the case of extra printing, a time-consuming operation is required to compare the negative film with the prints.

Also, since the holders for reversal films are provided individually, a time-consuming operation is needed to retrieve a desired frame.

Further, both types of holder merely have the function of holding film pieces and their added values are therefore low. In particular, since negative films are inconvenient and difficult to handle, only an extremely limited number of experts can actively utilize the negative films if there is a need. for example, to trim a portion of one picture. Accordingyly, with the conventional form of photographic-film holder, it has been impossible to enhance the added value of negative films.

SUMMARY OF THE INVENTION

It is, therefore, an object of the present invention to provide a film holder for storing a processed film which can overcome the aforesaid problems experienced with the conventional type of film holder for storing a processed film, and which facilitates the handling and observation of the processed film, as well as offering additional novel functions useful for retrieval or printing.

To achieve the above and other objects, in accordance with the present invention, there is provided a film holder for storing a processed film which is provided with film holding means including a film container for accommodating a processed film and arranged to allow the processed film accommodated in this film container to be observed therethrough, an information recording medium in which is recorded printing conditions concerning at least the accommodated processed film, and information holding means provided on the film container for holding the information recording medium.

In one embodiment of the present invention, there is provided a film holder for storing a processed film, which is provided with a film holding section for accommodating a processed film and an information holding section having an information recording medium for recording the conditions required for at least printing. The film holding section is arranged to support a plurality of films so that they can be observed in a common plane. The information holding section is arranged to record information in electrical, magnetic or optical form.

In another embodiment of the present invention, there is provided a film container which has a pair of film spools which provides support for a processed roll film and an observation window which allows at least one frame of the processed film to be viewed therethrough. The information holding section is arranged to hold printing information including at least color-correction information.

In accordance with the present invention, it is possible to easily observe a film merely by holding the film holder to the light with one end thereof supported in one hand. It is also possible to facilitate handling, for example, storage and filing, of negative films which have heretofore been difficult to handle, as well as to rapidly effect processes such as retrieval, printing and the like.

Further objects, features and advantages of the present invention will become apparent from the following detailed description of embodiments of the present invention with reference to the accompanying drawings.

DESCRIPTION OF THE PREFERRED EMBODIMENTS

Preferred embodiments of the present invention will be described in detail below with reference to the accompanying drawings.

Figure 1:
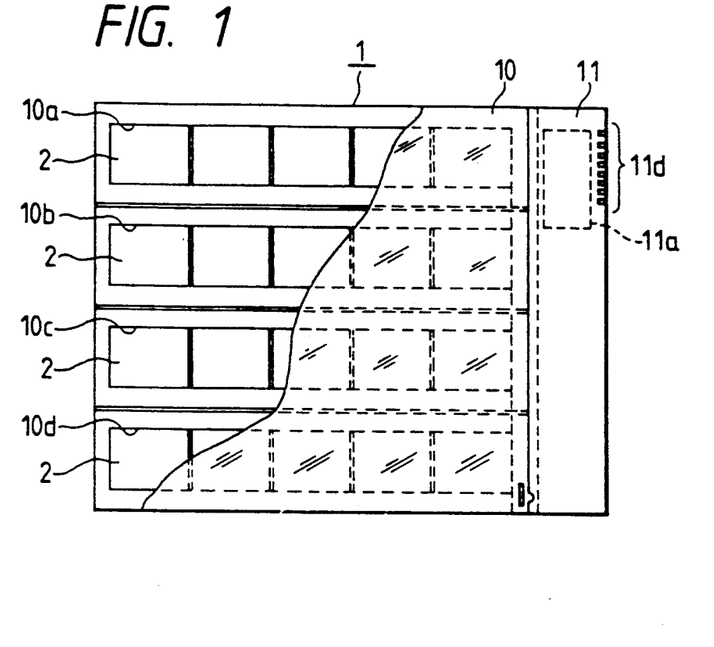
FIG. 1 is a plan view, with portions broken away, of a first embodiment of the present invention.
Figure 2:
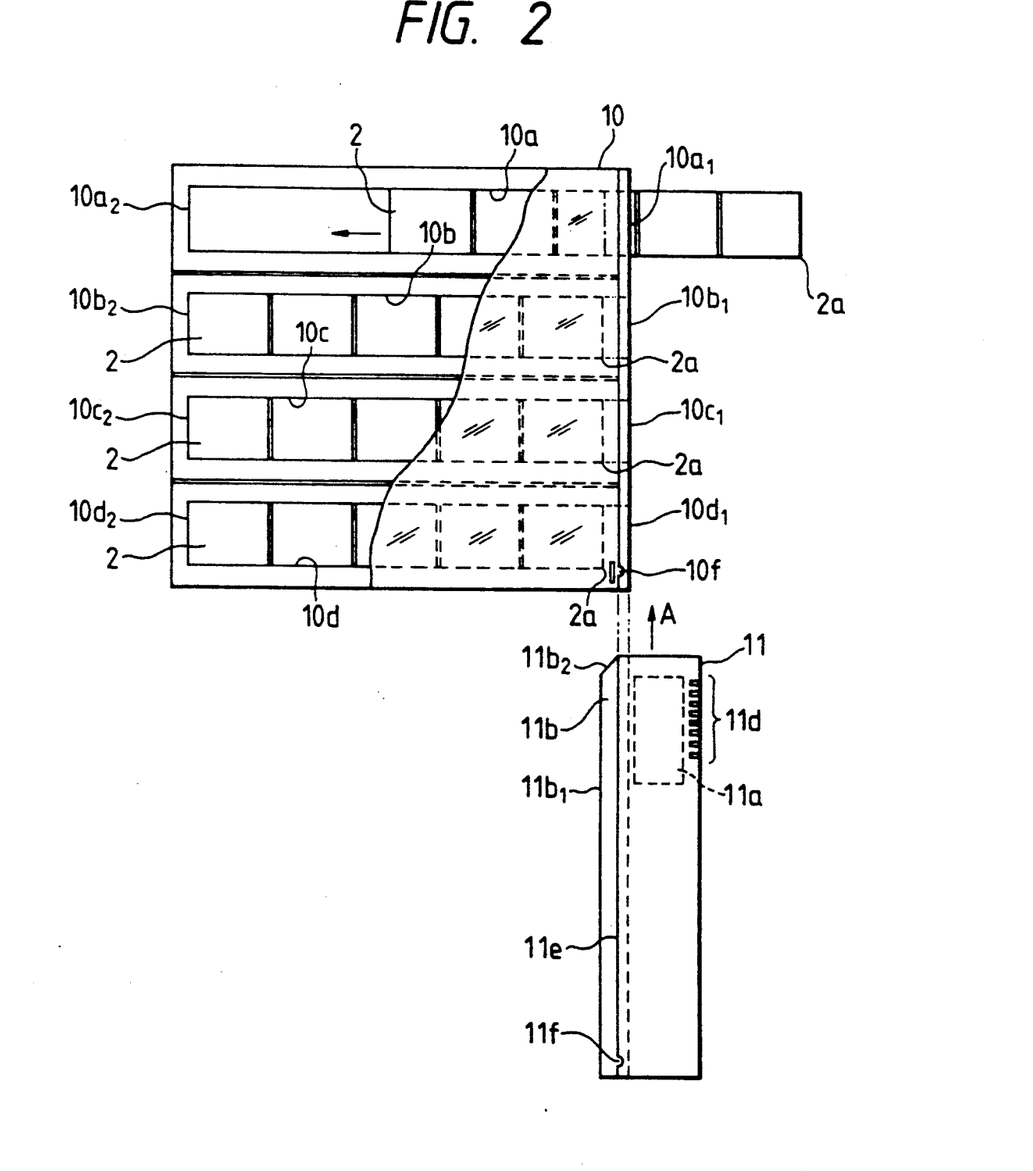
FIG. 2 is a plan view of the first embodiment, but shows a state wherein a film holding section and an information storing section are separated from each other with a portion of a film piece extracted from the film holding section.

Referring to FIGS. 1 and 2, a photographic-film holder 1, which is made of a synthetic resin having a high degree of transparency, has a film holding section 10 and an information storing section 11. The film holding section 10 has film chambers $10a$ to $10d$ which are arranged in four lines so as to allow four pieces of film 2 to be inserted into the respective film chambers $10a$ to $10d$ in the longitudinal directions thereof. The information storing section 11 can be removably attached to the film holding section 10, and electrical information can be freely written into and read from the information storing section 11. Each film piece 2 can be observed through either surface of the film holding section 10, and writing and reading of information into and from the information storing section 11 are achieved by means of a semiconductor memory (for example, $E^2$-PROM) $11a$ incorporated in the information storing section 11.

FIG. 1 shows a state wherein the information storing section 11 is attached to the film holding section 10, and FIG. 2 shows a state wherein the information storing section 11 is detached from the film holding section 10.

Figure 3:
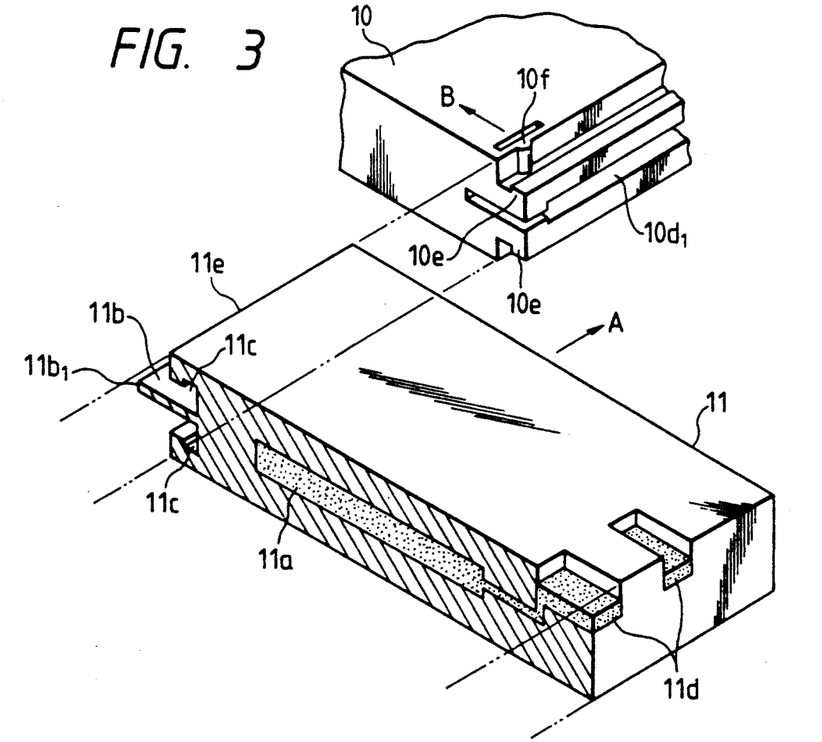
FIG. 3 is a partial enlarged perspective view of the film holding section and the information storing section in the state shown in FIG. 2.

As shown in FIG. 3, a dovetail-formed coupling means is formed at the right-hand edge of the film holding section 10 and the corresponding left-hand edge of the information storing section 11. If it is desired to join, as shown in FIG. 1, the film holding section 10 and the information storing section 11 which are separated as shown in FIG. 2, the left-hand edge of the information storing section 11 may be fitted into the right-hand edge of the film holding section 10 to cause the information storing section 11 to slide in the direction indicated by arrow A of FIG. 2. Such a coupling means will be described in more detail later.

Insertion ports $10_{a1}$ to $10_{d1}$ for insertion of film pieces 2 are formed in the right-hand ends of the film chambers $10a$ to $10d$, respectivley, while their left-hand ends $10_{a2}$ to $10_{d2}$ are closed. The film pieces 2 to be inserted into the respective film chambers $10a$ to $10d$ are prepared by processing the roll film packaged in a patrone (or magazine) and cutting the processed film into film pieces each having a predetermined number of frames (in this embodiment, five frames) and, hence, the same longitudinal size.

The insertion ports $10_{a1}$ to $10_{d1}$ are closed by the information storing section 11 which is attached to the film holding section 10, thereby preventing the film pieces 2 from coming out through the insertion ports $10_{a1}$ to $10_{d1}$. More specifically, as shown in FIG. 2, a projecting part $11b$ is formed throughout the left-hand edge of the information storing section 11, and the left-hand edge $11_{b1}$ of the projecting part $11b$ serves to inhibit rightward displacement of each film piece 2. The film pieces 2 are held in position between the corresponding left-hand ends $10_{a2}$ to $10_{d2}$ and the left-hand edge $11_{b1}$ of the projecting part $11b$. The film pieces 2 are therefore retained in such a manner that they cannot be displaced in either longitudinal direction.

A slope $11_{b2}$ is formed at the top left of the projecting part $11b$ as viewed in FIG. 2. As the information storing section 11 is slid in the direction indicated by arrow A of FIG. 2, if the slope $11_{b2}$ strikes a film piece 2 which projects to the right even slightly, the slope $11_{b2}$ pushes a bottom right corner $2a$ of the film piece 2 to the left, thereby displacing the film piece 2 to the left.

If the photographic-film holder 1 is so formed as to have a configuration, size and degree of rigidity which are similar to those of a commercially available 5-inch floppy disk, it is convenient for observation or handling of a processed photographic film. In this arrangement, if it is desired to accommodate as many frames as are shown in FIG. 1 in the photographic-film holder 1, it will be necessary to employ a photographic film which conforms to a standard having a format smaller than the current 35-mm format.

FIG. 3 is a partial enlarged perspective view which primarily shows the coupling means for coupling the film holding section 10 and the information storing section 11.

As shown in FIG. 3, a pair of engagement projections $10e$ is formed throughout the right-hand edge of the film holding section 10, while a pair of engagement grooves $11c$ is formed throughout the left-hand edge of the information storing section 11 so that the engagement projections $10e$ can be fitted into the engagement grooves $11c$, respectively. A projection $10f$ which serves as a click spring $10f$ is formed at the bottom of the right-hand edge of the film holding section 10. While the information storing section 11 is being slid with respect to the film holding section 10 for the purpose of, for example, attachment thereto, the projection $10f$ is pressed by a left-hand end surface $11e$ of the information storing section 11 and is thereby elastically deformed in the direction indicated by arrow B. After the attachment of the information storing section 11 has been completed, the click spring-like projection $10f$ falls into a click notch $11f$ (see FIG. 2) which is formed at a lower portion of the left-hand end surface $11e$ of the information storing section 11. Accordingly, the film holding section 10 and the information storing section 11 do not easily come off.

An input/output terminal $11d$ is formed at a portion of the right-hand end of the information storing section 11 so that information can be externally written into and read from the semiconductor memory $11a$ of the information storing section 11. The arrangement of this portion is achieved by utilizing techniques used in fabricating IC cards.

It is desirable that the operation of accommodating the processed film pieces 2 into each photographic-film holder 1 be automated as one process step of a complete film processing sequence. In this case, the film processing is carried out in accordance with the following procedure:

Step 1 An unprocessed film is taken out of its film patrone.

Step 2 The film is processed.

Step 3 The processed film is cut into the film pieces 2.

Step 4 The film pieces 2 are accommodated in the film holding section 10.

Step 5 The information storing section 11 is attached to the film holding section 10.

A typical example of information to be stored in the information storing section 11 is color-correction values used for printing in an enlarger (or printer). This information represents the color-correction values adjusted during a first printing process using the printer. Such color-correction information is written into the semiconductor memory 11a of the information storing section 11, together with frame numbers which are used by the printer for identifying the individual frames of the film pieces 2. Printing and recording of color-correction information are carried out in the following process sequence:

Step 1 The information storing section 11 is detached from the film holding section 10.

Step 2 The film pieces 2 are taken out of the film holding section 10.

Step 3 The color-correction value of a frame to be printed is determined.

Step 4 The specified frame is printed. The frame number of the printed frame and its color-correction value are written into the information storing section 11.

Step 5 The film pieces 2 are accommodated in the film holding section 10.

Step 6 The information storing section 11 is attached to the film holding section 10.

If processing and printing of an unprocessed film are simultaneously carried out, the process sequence is as follows:

Step 1 An unprocessed film is taken out of its film patrone.

Step 2 The film is processed.

Step 3 The processed film is cut into the film pieces 2.

Step 4 The color-correction value of each frame is determined.

Step 5 The frames are printed. The frame number of each printed frame and its color-correction value are written into the information storing section 11.

Step 6 The film pieces 2 are accommodated in the film holding section 10.

Step 7 The information storing section 11 is attached to the film holding section 10.

For the case of a second printing operation et seq. (for example, extra printing), prior to printing, the printer reads from the information storing section 11 the color-correction information corresponding to a frame ordered to be printed, and prints the frame while applying corresponding color correction to the frame. Accordingly, extra printing can be achieved without the need for a color correcting operation which has heretofore been required to readjust color balance each time printing is performed. It is therefore possible to reduce the cost required by extra printing.

The information storing section 11 may store, in addition to the aforesaid color correction information, various types of information associated with an order for printing, for example, the frame number of a frame to be printed, the number of prints, printing size, whether or not trimming is needed, the desired term up to finishing, printing costs and so forth.

Figure 4:
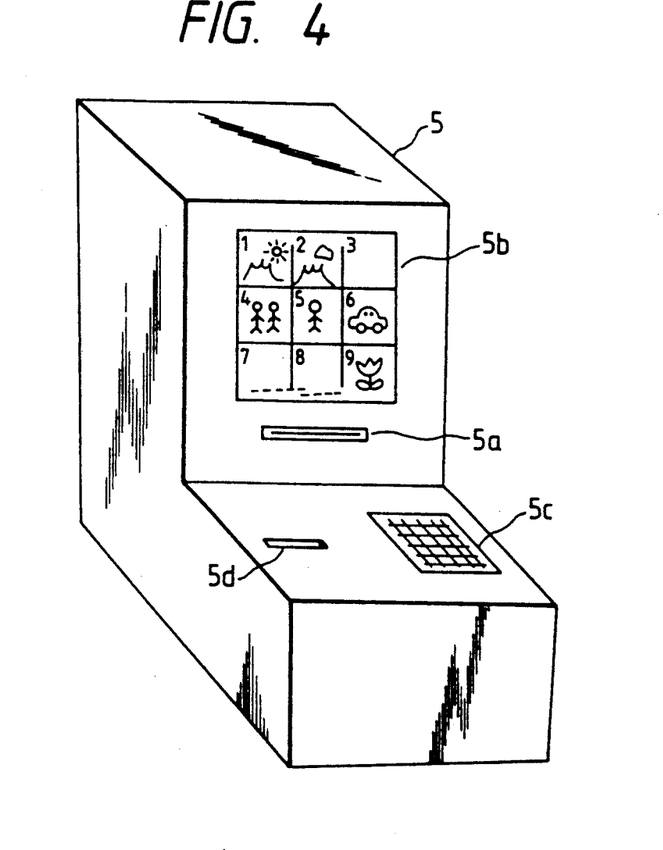
FIG. 4 is a schematic perspective view showing an automated print-order receiving apparatus utilizing the film holder shown in FIG. 1.

FIG. 4 is a schematic perspective view of an automated print-order receiving apparatus 5 used for entering the order information described above.

At the outer surface of the automated print-order receiving apparatus 5 are provided a holder inserting slot 5a, a display screen 5b utilizing a CRT (cathode-ray tube) or the like, a keyboard 5c, and a receipt issuing slot 5d. The automated print-order receiving apparatus 5 has in its interior (not shown) an imaging device, an image processing device, an image storing device, a character printing device, an information input/output device, a holder transporting device, a computer for providing general control over these devices, and the like.

A customer who orders a print inserts the photographic-film holder 1 into the holder inserting slot 5a. The photographic-film holder 1 inserted in the holder inserting slot 5a is fed into the automated print-order receiving apparatus 5 by means of the holder transporting device (not shown). The processed film pieces 2 accommodated in the photographic-film holder 1 are subjected to imaging in the order of frame numbers by means of the imaging device, and the thus-obtained image signals are supplied to the image processing device. The image processing device sequentially effects A/D conversion of the image signals supplied from the imaging device, and stores the results in the image storing device. This image storing device is capable of storing image signals corresponding to a plurality of frames (for example, all the frames of the film pieces 2 accommodated in the photographic-film holder 1).

The image processing device sequentially and repetitively reads image signals for some frames (for example, the frames of frame numbers 1 to 9) from the image storing device, then effects D/A conversion of the readout signals, and then displays multiple pictures on the display screen 5b as shown in FIG. 4. Numerical characters indicative of the frame numbers of the respective pictures which are reproduced from the selected frames on the display screen 5b are superimposed upon the corresponding pictures. The display screen 5b further includes a message display area for displaying messages which request the customer to specify the frame number of a frame desired to be printed, printing size and the number of prints as well as the execution or nonexecution of trimming, data printing and so forth as required.

In accordance with these messages, the customer operates the keyboard 5c to specify the desired frame number, printing size, the number of prints and the like. The results of the specifications are displayed in such a manner that they are superimposed upon the image information of the frame which was specified on the display screen 5b.

If the execution of trimming is specified, a message which instructs the customer to specify, through the keyboard 5c, the frame number of a frame to be trimmed appears on the display screen 5b. When the customer specifies the desired frame number in response to this message, the picture corresponding to the specified frame alone is displayed on the display screen 5b on an enlarged scale. Then, a message is output which instructs the customer to use a cursor key (not shown) on the keyboard 5c to specify the manner of trimming the picture. When the customer operates the cursor key in response to this message, a frame line which indicates an area to be trimmed is displayed in a superimposed manner on the display screen 5b. The customer can specify a desired form of trimming by controlling the frame line by means of the cursor key.

If the execution of data printing is specified, a message which instructs the customer to specify, through the keyboard 5c, the frame number of a frame on which data is to be printed is output onto the display screen 5b. When the customer specifies the desired frame number in response to this message, the picture corresponding to the specified frame alone is displayed on the display screen 5b on an enlarged scale. Then, a message is output which instructs the customer to use the keyboard 5c to input the data to be printed. When the customer inputs the data and a data printing position in response to this message, the data is displayed at the desired position in a superimposed manner on the picture of the specified frame.

The thus-specified order information is written into the semiconductor memory 11a of the information storing section 11 of the photographic-film holder 1 inserted in the apparatus, together with order-number information used for identifying the automated print-order receiving apparatus which received the order of printing. The written information is read out during a later printing operation so that printing according to the above specifications is effected.

The results of the above specifications, the price, the date and time of finishing of the print, the order number and the like are printed on a receipt, and the receipt is discharged through the receipt issuing slot.

The above-described automated print-order receiving apparatus 5 may be disposed in combination with an automatic printer (not shown) such that the photographic-film holder 1 is automatically conveyed from the automated print-order receiving apparatus 5 to the automatic printer. With this arrangement, it is possible to supply prints to customers, quickly and without the need for special operators.

To achieve such an automated print-order receiving apparatus 5, it is desirable that information indicative of a frame number be recorded in the vicinity of each frame of each film piece 2 (for example, in the areas between adjacent frames). Moreover, if each frame is provided with a registration mark (not shown) used for aligning the selected frame of a film piece with the imaging device of the automated print-order receiving apparatus 5, it is possible to easily display the picture of each frame on the display screen 5b without any offset. The above-described frame number information and registration marks may be printed simultaneously with the exposure of film in a camera or during the processing of the film. In particular, if cameras are arranged so that the frame number information and registration marks can be printed during the exposure of film, the frame number information and registration marks can be utilized in later film processing.

Although the above embodiment is arranged such that the film pieces 2 can be taken out of the film holding section 10, the present invention is not limited to this specific arrangement and, for example, each film piece may be hermetically enclosed in a laminated transparent film. In this arrangement, it is not necessary to take out the film piece for printing. Also, the information storing section 11 may be laminated integrally with the film holding section 10.

The kind of storing medium for use in the information storing section 11 is not limited to the semiconductor memory 11a such as that used in the above embodiment, and various other recording media such as magnetic recording media, opto-magnetic recording media and the like may be employed. Moreover, if information to be stored is of the type which requires no rewriting such as the color-correction information described above, it is possible to employ recording media of the type which allows information to be recorded only once, such as light-sensitive paper, heat-sensitive paper or the like.

The present invention is also applicable to a reversal film. In the case of a reversal film, a slide projector may be aligned with the photographic-film holder according to the present invention to project an image of each frame on a screen.

As described above, in accordance with the present invention, since a plurality of pieces of film are supported by a film holding section so that they can be arranged for observation, all the film pieces can be observed at the same time through either transparent surface of the photographic-film holder. Moreover, since the rigidity of the holder is high, it is possible to observe a plurality of film pieces merely by holding the holder to the light with its one end supported in one hand.

In addition, the information storing section can be made to store various types of information relative to color-correction values, exposure-correction values and the like which are set during an initial printing operation. Accordingly, since such information can be read out during extra printing, it is not necessary to reset the same information at the time of each extra printing operation.

If print-order information indicating which frame and how many numbers should be printed in which size is also stored and if such print-order information is utilized to automate the control over various steps such as an order of prints, reception of the order, printing, delivery of prints, and charging for prints, by means of a computer, it is possible to greatly reduce the costs required for such control.

Figure 5:
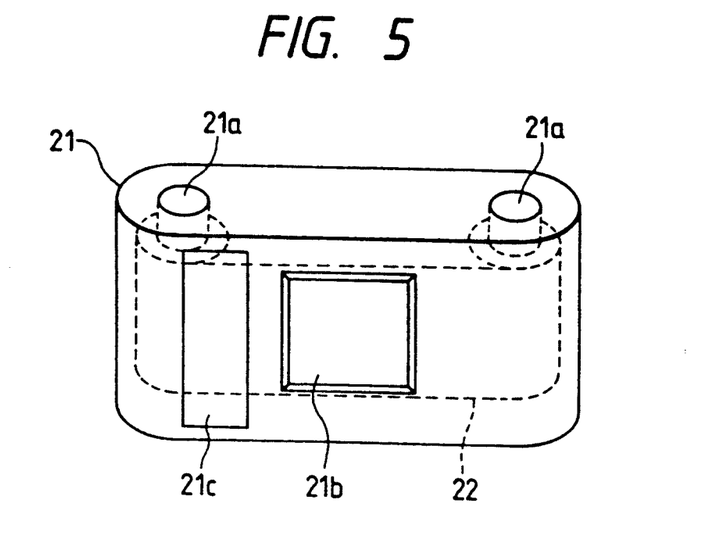
FIG. 5 is a perspective view of a second embodiment of a film holder for storing a processed film in accordance with the present invention.

FIG. 5 is a schematic perspective view showing the construction of a second embodiment of a photographic-film holder according to the present invention, which holder is arranged so that a processed roll film can be stored without being cut as shown in FIG. 1.

A processed film 22 is accommodated in the film chamber of a photographic-film holder 21 in a form looped around a pair of winding shafts 21a. The accommodated processed film 22 can be observed through a transparent window 21b provided in the photographic-film holder 21. Also, an information recording section 21c is provided on the outer wall of the photographic-film holder 21.

Figure 6:
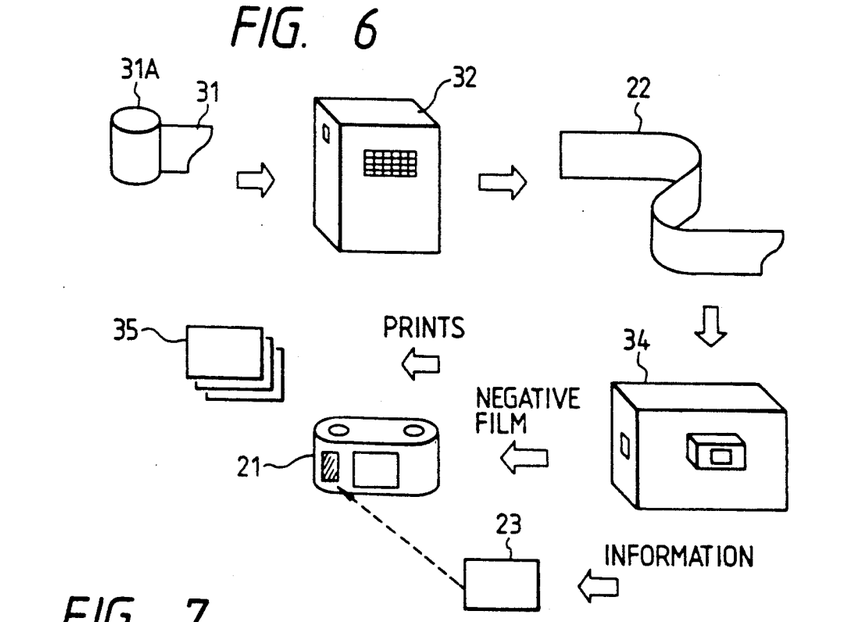
FIG. 6 is a diagram which serves to illustrate the process which starts with the step of printing a film and which ends with the step of storing the film in the film holder shown in FIG. 5.

FIG. 6 is a view which serves to illustrate a process for processing an exposed film, finishing the processed film in the form of prints, and accommodating the film and the prints in the photographic film holder 21. As illustrated, an exposed film 31 is processed in a processing apparatus 32 and then discharged as a negative film 22 cut away from a patrone 31A.

The negative film 22 is processed by a printer 34 (including an enlarger), and the printer 34 outputs the photographic-film holder 21 which accommodates prints 35 and the negative film 22 used for printing and, in addition, information 23 which is effectively used as will be explained later. One point to be noted in this embodiment is that the negative film 22 is accommodated in the photographic-film holder 21 which is advantageous to both storage and handling. The other point to be noted is that the information 23 including the information used in the printer 34 and various other information is added to the photographic-film holder 21.

Figure 7:
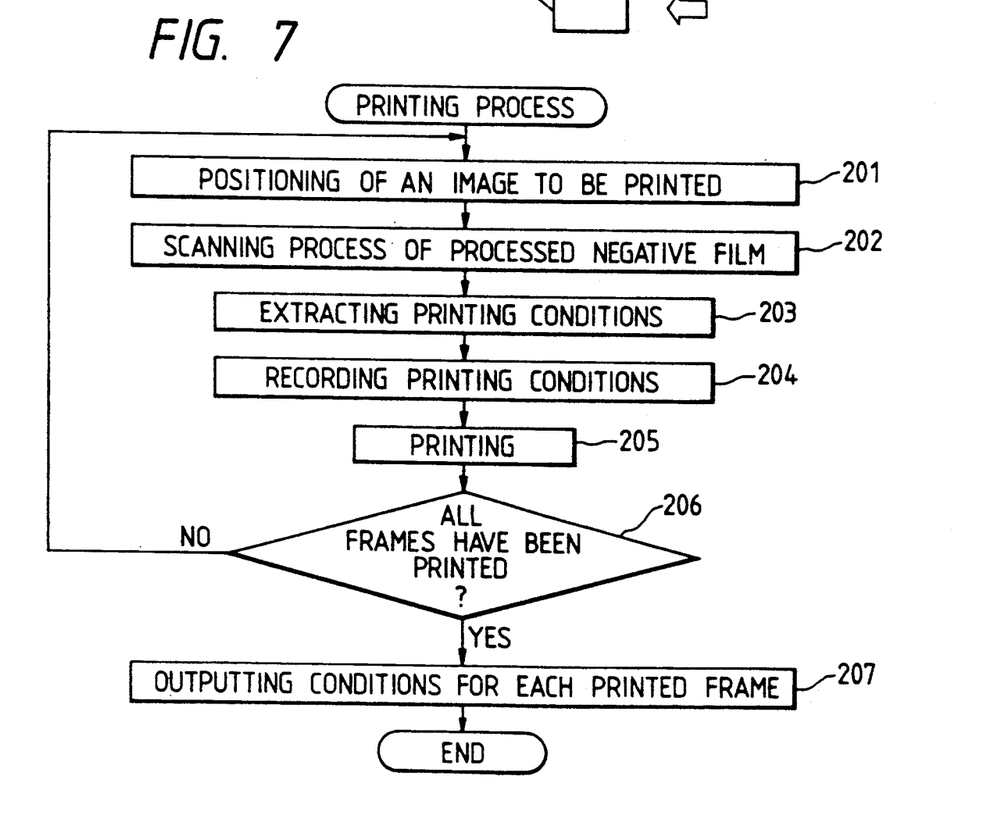
FIG. 7 is a flow chart which serves to illustrate the information recording executed by the printing process in the printer shown in FIG. 6.

FIG. 7 is a flow chart showing a concrete procedure for recording the information 23. When a negative film is set in the printer 34, positioning of an image to be printed is first effected as shown in Step 201. In Step 202, a scanning process for extracting the printing conditions for the image, that is, the conditions required for brightness correction and color correction is effected (more specifically, a process for detecting brightness information and color information relative to the processed negative film). In Step 203, these conditions and information are extracted. In Step 204, the conditions and the information are recorded. In Step 205, printing based on the above conditions is effected and it is determined in Step 206 whether or not all the required frames have been printed. If the printing of all the frames has not yet been completed, the same operation and process as those described above are repeated. If the required printing has been completed, the process proceeds to Step 207, which is a process step for outputting the above-described various conditions for each printed frame in a certain form such as the form provided by any of information processing methods which will be described later.

According to the embodiment shown in FIG. 6, in order to convey the above conditions, for example, a certain form of sheet 23 to which is added printing information such as a bar code is output and adhesively attached to the film holder 21. An alternative method is to record such conditions on a magnetic recording medium and adhesively attach the medium to the film holder 21. Instead of the method utilizing adhesion, it is also possible to utilize a method of providing a magnetic recording medium such as a magnetic tape on the film holder 21 in advance and recording the required information directly thereon by means of a printer 34.

Figure 8:
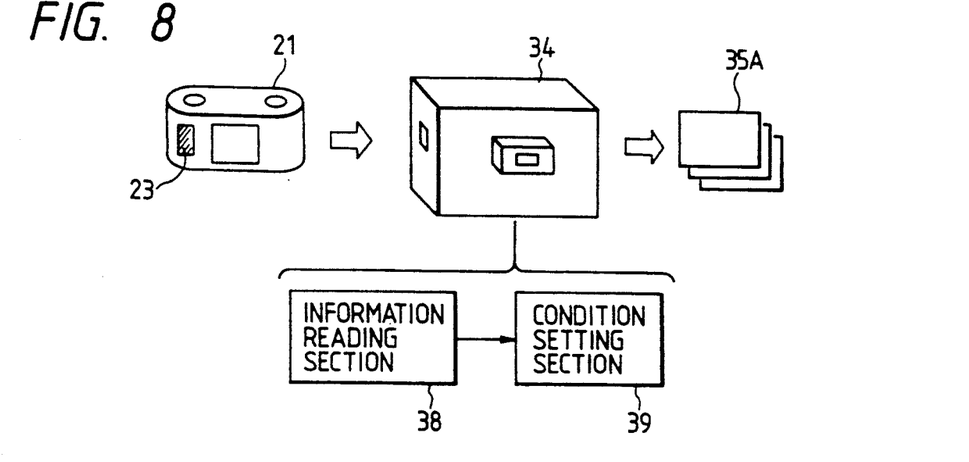
FIGS. 8 and 9 are diagrams each of which serves to illustrate a different example of utilization of the information recording section of the film holder shown in FIG. 5.

The information 23 which has been recorded on the film holder 21 in the above-described manner is utilized as shown in FIG. 8. As described above, the various conditions determined at the time of the initial printing are recorded on the film holder 21 as the information 23 and it is therefore possible to achieve faithful reproduction by utilizing these conditions. In the arrangement shown in FIG. 8 by way of example, when the film holder 21 is loaded into the printer 34, an information reading section 38 located in the printer 34 reads the recorded information 23 and transmits printing conditions such as the amount of exposure correction, the value of color correction and the like to a condition setting section 39. The printer 34 in turn outputs an extra print 35A on the basis of the transmitted printing conditions.

The information referred to in the above description is related to the conditions which are directly required for printing. However, the contents of information usable in this embodiment are not limited solely to the above-described ones. For example, proper information used in labs (photofinishing laboratories), such as the identification number of the lab, the date and time of printing and the like, can also be recorded in addition to the above information. Accordingly, various applications in the field of distribution can be expected.

Figure 9:
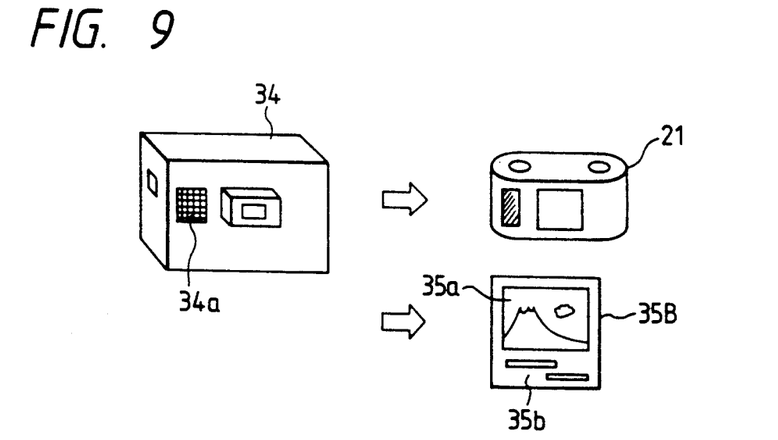

FIG. 9 shows a particular applied example of the arrangement shown in FIG. 8. In this example, the printer 34 has an arrangement which enables characters and the like to be entered into the printer 34 and which enables such character information to be recorded on the film holder 21. More specifically, a keyboard 34a is provided on the front side of the printer 34 so that characters, symbols or the like can be entered into the printer 34. In a manner similar to that used in the embodiment of FIG. 1, the character information entered through the keyboard 34a is recorded on the film holder 21 for the purpose of storage. The print output from the printer 34 is as shown by numeral 35B, that is, consists of, for example, a picture 35a and a comment 35b.

Figure 10:
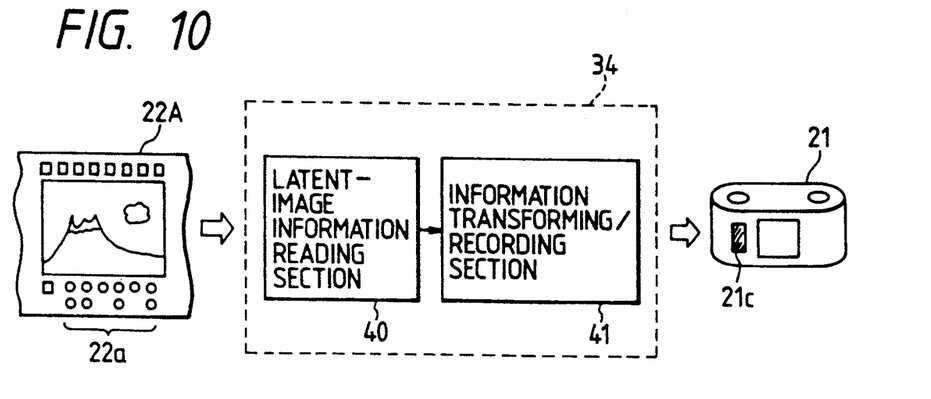
FIG. 10 is a diagram which serves to illustrate the operation of transferring latent-image information recorded on a film.

FIG. 10 shows still another applied version of the above embodiment. This version constitutes an embodiment suitable for use in processing information of the type which is recorded on a photographic film as a latent image. For example, a camera used in this application is arranged to optically record photographing conditions for each frame, and on the basis of the optically recorded information, various characteristics of each frame can be represented. A typical example of such a camera is a trimming camera.

FIG. 10 shows a process first for reading out information 22a, which is recorded on a negative film 22A as a latent image by a trimming camera (not shown), by means of a latent-image information reading section 40 incorporated in the printer 34 and then for transforming the read information into a form which complies with the recording format of an information recording section 21c of the film holder 21 by means of an information transforming/recording section 41; that is to say, a process for transferring information from the negative film 22A to the film holder 21. As is known, in latent-image recording, it is impossible to apply an amendment or an addition to recorded information at a later time and, therefore, a drawback may be experienced, for example, when it is desired to alter a trimming area. In this embodiment, however, it is possible to transfer from one medium to another, particularly to a medium, such as that shown in FIG. 10, which allows easy reading and writing of information. Accordingly, if an amendment or an addition is needed, it is possible to easily apply the required processing to the recorded information. Another advantage of the embodiment of FIG. 10 is that, after the information processing by the printer 34, it is possible to handle all the information by using common recording media and reading apparatus.

In order to achieve the above advantages, the pritner 34 may be designed to solely provide an interface with the recording media of the film holder 21, and a device having information reading means and information transforming means may be provided independently of the printer 34.

Figure 11:
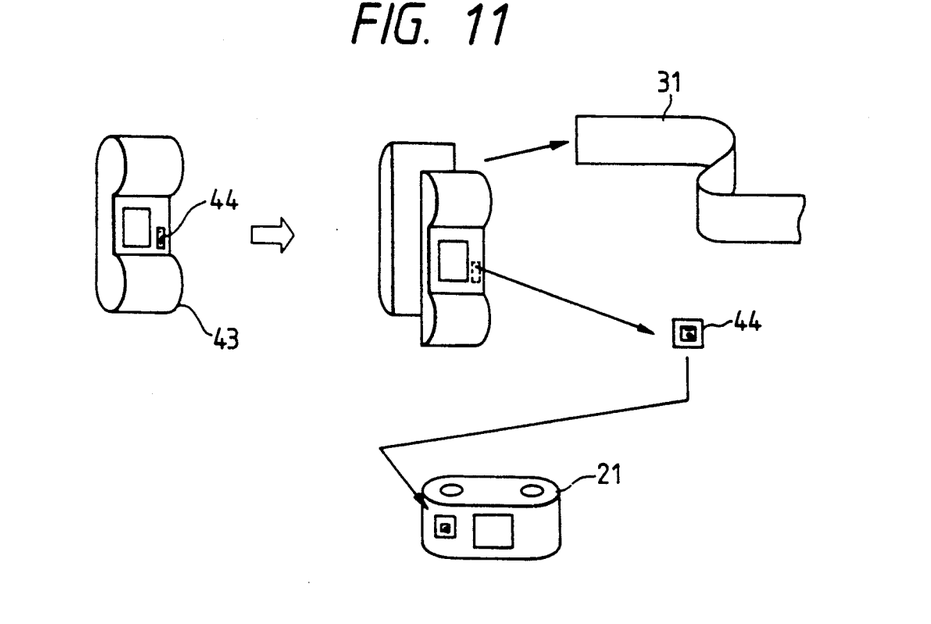
FIG. 11 is a diagram which serves to illustrate an example of utilization of a semiconductor recording device provided on the film cartridge of a camera.

FIG. 11 shows an example which uses a semiconductor recording device as a medium for recording information concerning photography. Since the semiconductor recording device is attached to the film holder 21 as in the case of a positive-film accommodating cartridge of the type disclosed in Japanese Patent Laid-open No. 59-15814 or the photographic-film holder 1 shown in FIG. 1, it is possible to achieve effects and advantages equal to or greater than those of latent-image recording described above.

It may be considered that such a semiconductor recording medium is effectively utilized in the case of the film holder having the semiconductor recording medium. In FIG. 11, an exposed but unprocessed film 31, which is accommodated in a film cartridge 43 of a camera (not shown), is separated from the film cartridge 43 prior to a development process, and is then subjected to the development process. In this example, accordingly, the film 31 and the cartridge 43 are separated from each other and information concerning photography, together with a semiconductor recording device 44 attached to the cartridge 43, is also separated from the film 31. The semiconductor recording device 44 itself may be transferred to the film holder 21 in which the processed film is to be stored. That is to say, a simple physical transfer from one position to another is substituted for the transfer of information such as that shown in FIG. 10. Although not shown, a semiconductor device of even larger size may be provided on the film holder 21 so that the required information can be transferred to it, or a magnetic recording medium may be provided on the film holder 21 so that the required information can be transferred to it.

Figure 12:
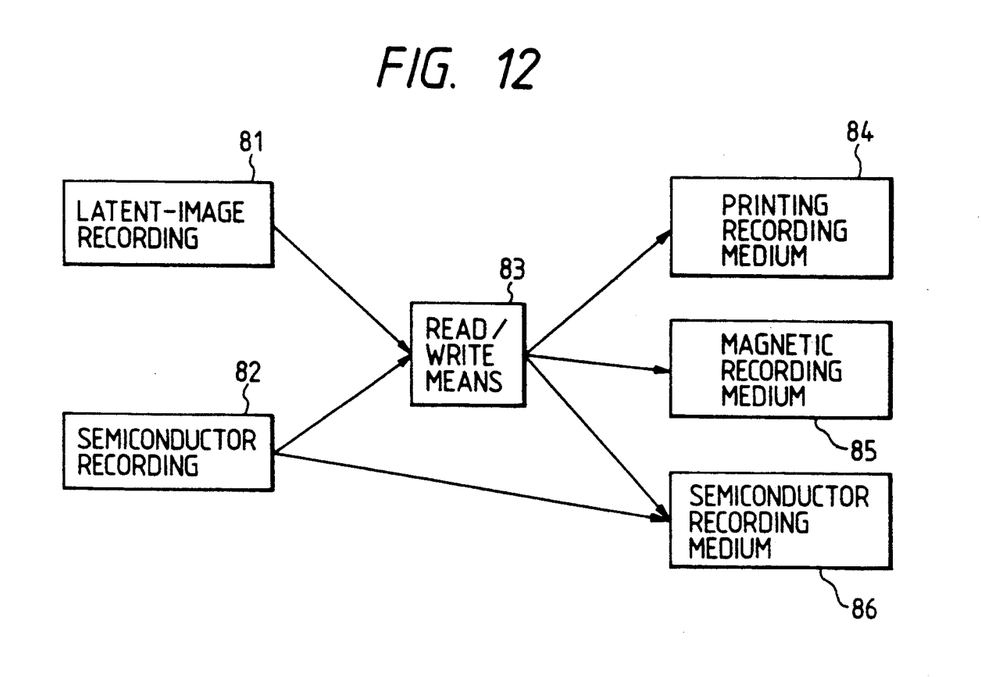
FIG. 12 is a block diagram which serves to illustrate the relationship between information and media.

FIG. 12 shows a flow of information based on the premise that a camera serves to record photography information on a film, as illustrated in the above-described embodiments, particularly in FIGS. 10 et seq. The block "latent-image recording" indicated by numeral 81 and the block "semiconductor recording" indicated by numeral 82 represent the types of recording medium utilized in individual cameras when photography information is to be recorded. The recording media are processed by read/write means 83 provided in a lab. A printing recording medium 84, a magnetic recording medium 85, and a semiconductor recording medium 86 represent a final form of information recording medium provided on the film holder 21.

Figure 13:
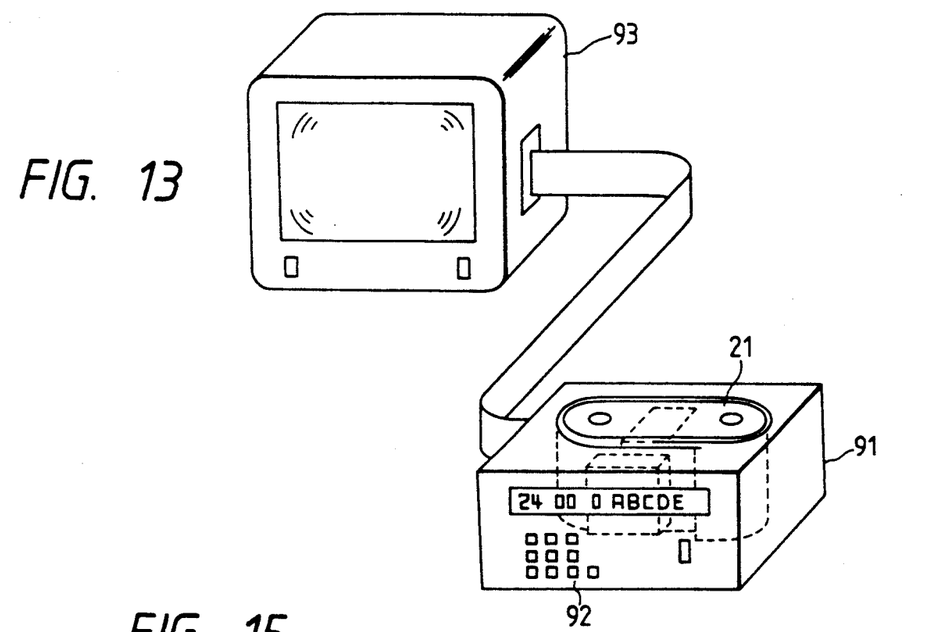
FIG. 13 is a diagrammatic perspective view showing the construction of a film observing apparatus provided with the film holder, shown in FIG. 5, for storing a processed film.

If convenient handling and the flexibility of addition of information which constitute specific features of the film holder 21 are utilized, yet another system may be employed. FIG. 13 shows an example of such a system and illustrates an observation apparatus which is generally constructed of a controller 91 into which the film holder 21 is loaded and a viewer 93 having a monitor such as a CRT.

This apparatus has the function of reversing an image from negative to positive and is arranged to allow easy observation of the image. The controller 91 is provided with operating switches such as a keyboard 92 which are used to perform functions which will be described below.

For example, it is possible to easily effect retrieval of a desired picture by entering a retrieval key word for the information recording section 21c of the film holder 21. This function enables retrieval to be achieved in units of either film pieces or frames. For example, if the title of an event, the number of persons, a date or a comment is entered, it is possible to carry out retrieval or observation by using such information as a key word.

In addition to the functions of retrieval and observation, the capability of the system can be extended into the region of editing. For example, in a case where it is desired to trim a portion of the picture reproduced on the screen of the viewer 93, where it is desired to forcibly alter the color of the picture, or where it is desired to impart a special effect such as the effect of a soft filter, an operator can carry out the required processing by operating the controller 91 while monitoring the picture displayed on a screen and then record the results on the information recording section 21c of the film holder 21. Subsequently, prints may be produced on the basis of the recorded information.

In addition, the observation apparatus shown in FIG. 13 can be satisfactorily applied to the processing of audio information. For example, a key word for audio input is created for each picture and, on the basis of the key word, it is possible to give a commentary account synchronized with the operation of an audio input/output section provided in the controller 91.

Moreover, regarding the operation of editing, if the controller 91 is provided with another type of recording medium such as a floppy disk and is arranged to allow sequential or simultaneous loading of several film holders 21, it is possible to achieve information processing for making a kind of album in which the required pictures (frames) only are collected.

Figure 14:
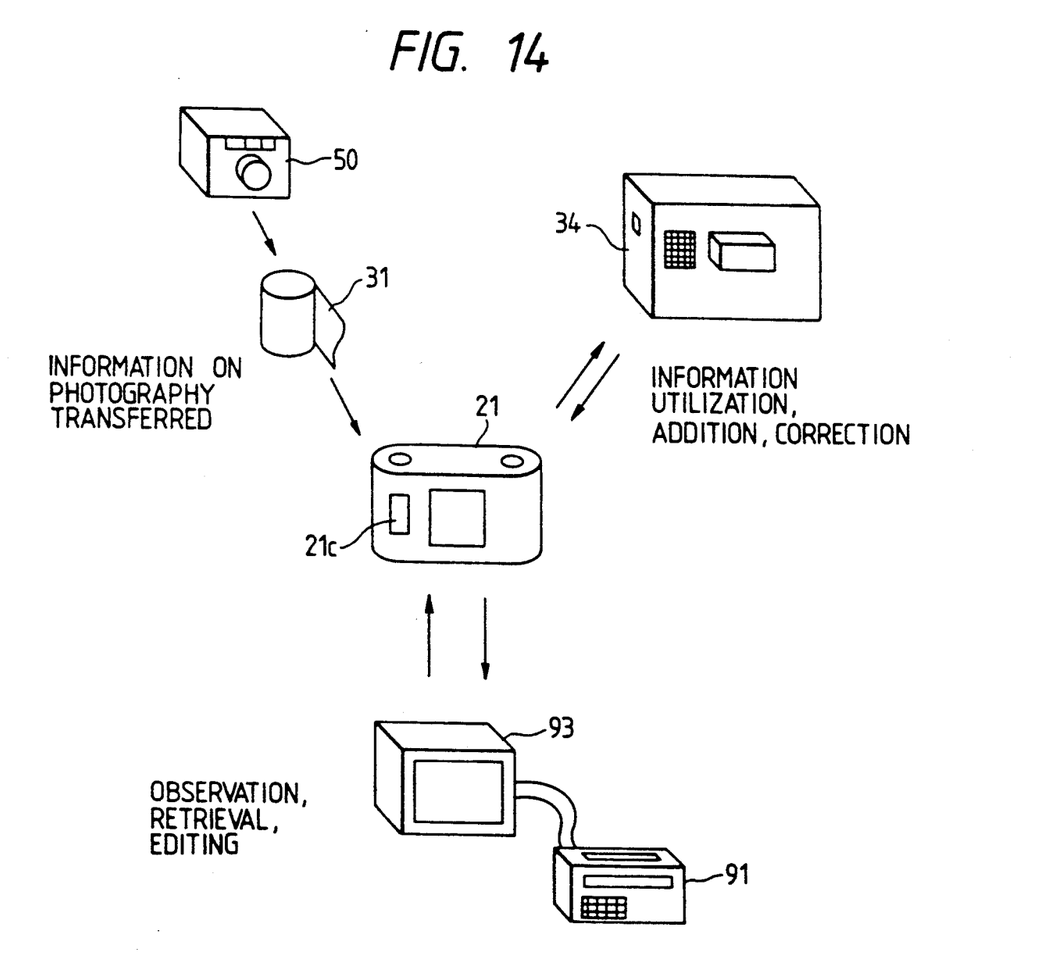
FIG. 14 is a diagram which serves to illustrate the manner of utilization of information during the process of from the photographing step to the extra-printing step.

FIG. 14 shows a flow of information which is centered about the film holder 21 for the sake of summary of the usage of the film holder.

Information relative to photography is transferred from a camera 50 to a film 31 or a film cartridge including the film 31 for recording purposes. Thereafter, the film 31 is processed and accommodated in the film holder 21 in a form which is convenient in terms of handling and storage. The information upon photography is transferred to the information recording section 21c of the film holder 21.

The relationship between the film holder 21 and the information 21c added thereto and equipment such as the printer 34 constitutes bidirectional transmission as viewed in terms of the communication of information.

For example, the conditions used for printing, such as a color correction value, an exposure correction value and the like, are recorded on the film holder 21 as printing conditions, and the recorded information is recorded at the time of later reprinting. Comments made of, for example, characters are also utilized in bidirectional fashion, that is, the information recorded on the information recording section 21c of the film holder 21 is again utilized in equipment such as the printer 34. Moreover, when the mode of observation, retrieval, editing or the like which is executed by a combination of the controller 91 and the viewer 93 is to be set, information is communicated bewteen the film holder 21 and the controller 91 in bidirectional fashion.

Figure 15:
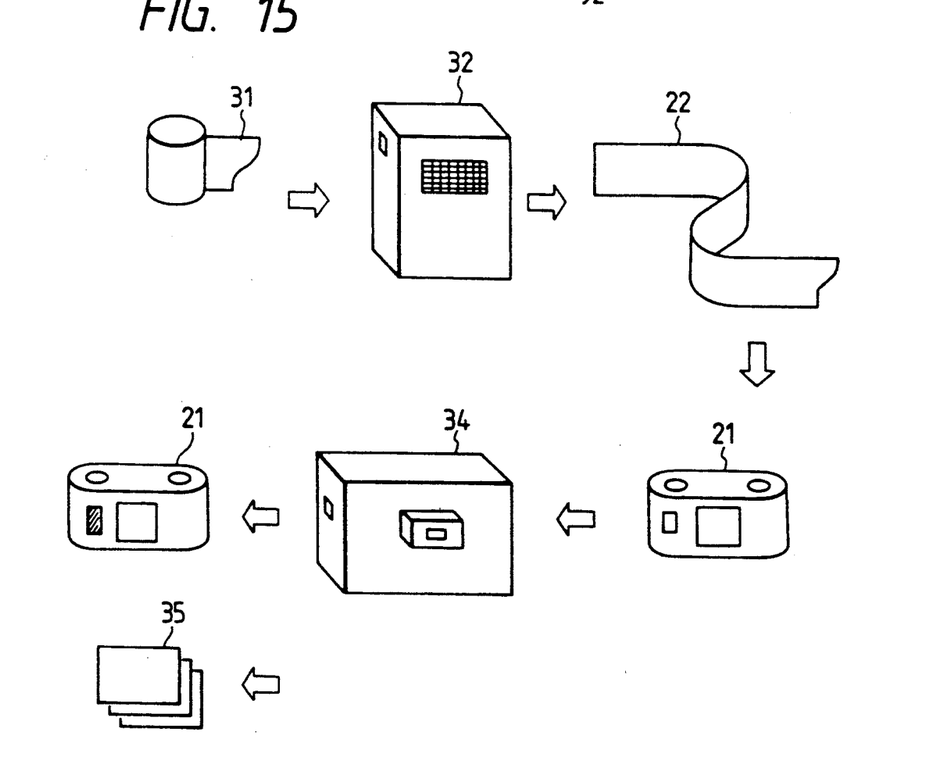
FIG. 15 is a diagram which serves to illustrate a process, different from the process of FIG. 6, which starts with the step of printing a film and ends with the step of storing the film in the film holder.

The above embodiments of the present invention may be modified as follows. FIG. 15 shows a system in which, after the exposed film 31 has been processed in the processor 32, the resultant negative film 22 is accommodated in the negative film holder 21. In this system, it is also possible to enter information into the film holder 21, for example, in a process step prior to the printing of each frame on photographic paper 35 in the printer.

The cameras capable of recording photography information which are used in the above-described embodiments (shown in FIGS. 10, 11 and so forth) are very convenient since it is possible to make a decision as to special conditions. This convenience is derived from a process in which printing is effected after the negative film 22 has been transferred from its patrone to the film holder 21 and after the information has also been transferred to the film holder 21.

In addition, prior to the processing in the printer 34, the negative film 22 may be accommodated in the film holder 21 and the interchangeable ROM of a camera itself or the contents of the ROM may be transferred to the film holder 21.

As described above, according to the second embodiment of the present invention, it is possible to achieve the advantages of enabling convenient handling, for example, easy storage and filing, of negative films which have heretofore been difficult to handle. Moreover, the second embodiment has the advantage that the system can be evolved in various directions by utilizing information which serves as an added value.

What is claimed is:

1. A film holder for storing a processed film, comprising:

film holding means including a film container for accommodating a processed film and arranged to allow said processed film accommodated in said film container to be viewed therethrough, said film container having a plurality of film chambers disposed in side-by-side relationship, each film chamber having an insertion port for allowing insertion of processed film at one end thereof;

an information recording medium in which is recorded at least printing conditions as to said processed film accommodated in said film container; and information holding means for holding said information recording medium, said information holding means being disposed adjacent to the insertion port of each of said film chambers and being arranged to move with respect to said film chambers to close or open the insertion port of each of said film chambers.

2. A film holder according to claim 1, wherein each film chamber has opposite transparent surfaces which support said processed film therebetween, said film container being arranged to allow a plurality of processed films to be observed in a common plane.

3. A film holder according to claim 2, wherein said information holding means is arranged so that it can be attached to and detached from said film container.

4. A film holder according to claim 2, wherein said information recording medium includes a recording medium whose recorded contents can be altered.

5. A film holder according to claim 4, wherein said information recording medium includes at least one selected from among a semiconductor storage medium for storing electrical information, a magnetic recording medium, and an opto-magnetic recording medium.

6. A film holder according to claim 2, wherein said information recording medium is any one selected from among light-sensitive paper, heat-sensitive paper and a printing recording sheet all of which are of the non-rewritable type, said information holding means being arranged to adhesively support said information recording medium.

7. A film holder according to claim 1, wherein said information holding means is arranged to move slidably relative to said film holding means.

8. A film holder according to claim 7, wherein said film chambers are elongated in a direction perpendicular to a direction of slidable movement of said information holding means.

9. A film holder according to claim 8, wherein said film holding means and said information holding means have cooperable surfaces for guiding the sliding movement of said information holding means.

10. A film holder according to claim 8, wherein said film holding means and said information holding means have cooperable means for releasably retaining said information holding means in a position relative to said film holding means at which said information holding means closes the insertion port of each of said film chambers.

11. A film holder according to claim 8, wherein said information holding means has a tapered surface for engaging processed film that protrudes from the insertion port of corresponding film chambers to move the last-mentioned processed film into the corresponding film chambers as said information holding means is moved to close the insertion port of each of said film chambers.

12. A film holder for storing a processed film, comprising:

film holding means including a film container for accommodating a processed film and arranged to allow said processed film accommodated in said film container to be viewed therethrough, said film container having a plurality of film chambers disposed in side-by-side relationship and each having opposite transparent surfaces which support said processed film therebetween, said film container being arranged to allow a plurality of processed films to be observed in a common plane;

an information recording medium in which is recorded at least printing conditions as to said processed film accommodated in said film container; and information holding means for holding said information recording medium, said information holding means being arranged so that it can be attached to and detached from said film container.

13. A film holder according to claim 12, wherein said film container has an insertion port for allowing insertion of said processed film at its one end connectable to said information holding means, said information holding means being arranged to close said film insertion port when said information holding means is attached to said one end of said film container.

14. A film holder for storing a processed film, comprising:

film holding means including a film container for accommodating a processed film and arranged to allow said processed film accommodated in said film container to be viewed therethrough, said film container having a plurality of film chambers disposed in side-by-side relationship, each film chamber having an insertion port for allowing insertion of processed film at one end thereof;

an information recording medium in which is recorded at least printing conditions so as to said processed film accommodated in said film container; and information holding means for holding said information recording medium, said information holding means being disposed adjacent to the insertion port of each of said film chambers and being arranged to move with respect to said film chambers to close or open the insertion port of each of said film chambers;

wherein said information holding means is arranged to move slidably relative to said film holding means, and said film chambers are elongated in a direction perpendicular to a direction of slidable movement of said information holding means, and wherein said film holding means and said information holding means have cooperable surfaces for guiding the sliding movement of said information holding means.

* * * * *